Aug. 3, 1965  J. B. OVERTON  3,198,007
ACOUSTIC TESTING CHAMBER
Filed May 23, 1961  2 Sheets-Sheet 1

INVENTOR.
JERRY B. OVERTON

Aug. 3, 1965  J. B. OVERTON  3,198,007
ACOUSTIC TESTING CHAMBER
Filed May 23, 1961  2 Sheets-Sheet 2

INVENTOR.
JERRY B. OVERTON 3,198,007
ACOUSTIC TESTING CHAMBER
Jerry B. Overton, 1720 Rialto, Oxnard, Calif.
Filed May 23, 1961, Ser. No. 112,127
11 Claims. (Cl. 73—69)
(Granted under Title 35, U.S. Code (1952), sec. 266)

The invention described herein may be manufactured and used by or for the Government of the United States of America for governmental purposes without the payment of any royalties thereon or therefor.

The present invention relates to a chamber for testing components or devices in a controllable environment intended to simulate as closely as possible actual acoustic conditions under which their operation would occur.

In many circumstances, it is highly desirable to be able to evaluate the acoustic performance of an entire assembly (or of certain components thereof) prior to placing them in operation. This is particularly true in the case of component intended for incorporation into guided missiles or rockets (as well as of the unitary projectile assembly itself) since the stresses to which these devices will be subjected are frequently quite severe and the matter of reliability becomes of paramount importance. In the case of missiles intended to travel at supersonic or hypersonic speeds, very high aerodynamic stresses are placed upon the structural portions of the missile assembly due to the development of mechanical vibrations generated during passage of the missile through the atmosphere. Up to the present time, it has been difficult to accurately simulate all of these environmental conditions, as a result of which the data obtained from the test procedure is frequently unreliable and cannot be fully depended upon as a guide in setting up design requirements.

A number of methods are available for generating acoustic vibrations of high intensity. These include a siren adapted either to produce vibrations of a particular predetermined frequency or to produce random noise (in which the acoustic energy is of many different frequencies), and an air-modulated loud-speaker. Each of these methods of generating acoustic energy may be utilized depending upon the particular operating environment which it is desired to simulate.

Acoustical chambers in use at the present time customarily incorporate some means for generating sound vibrations of a particular character, together with additional means for increasing the intensity of these vibrations by some procedure such, for example, as by progressively restricting the cross-sectional area of the passageway through which the energy travels to its point of utilization. One device for accomplishing this result consists of an inverse horn at the open end of which the noise is generated and from the restricted end of which the sound vibrations emerge. The output from a horn of this character consequently is of considerably higher intensity than that which exists at the input or generating end thereof.

Such arrangement, however, are not completely satisfactory, due in part to the excessive energy loss which occurs as the acoustic waves are sequentially reflected from the interior surface of the horn. Furthermore, after reflection these waves are traveling along paths which are angularly disposed to one another, and hence depart considerably from an emergent condition of parallel relationship. Still further, it is difficult to maintain a constant output frequency from such a device, since the reflected waves "beat" with one another to generate a plurality of frequencies. This disadvantage is not overcome by employing separate energy sources the respective outputs of which do not combine until they reach the area in which the test object is located, since it is essential for proper testing that all the energy arrive at a given point along a common path.

The optimum design for an acoustical test chamber is one which will satisfy a number of important conditions. These include the ability to test an assembly of a size equal, for example, to that of a small missile or rocket, the ability to develop acoustical vibrations of either a single frequency or a mixture of frequencies, and the still further ability to achieve a sound pressure level of at least 160 decibels. To facilitate operation of the chamber, the means for generating the acoustical energy should be capable of being controlled in a selective manner, such as by data derived from a tape recorder. The above considerations thus indicate a chamber of considerable size which must, in addition, be not only versatile but relatively inexpensive to construct and maintain.

The present concept is intended to incorporate a number of features which eliminate the disadvantages existing in known arrangements of the type under consideration. In accordance with one feature of the disclosure, two separate sources of acoustical energy are provided, each of which may be controllable in frequency within different operating ranges. These sources form part of a testing complex which includes an elongated chamber within which the component or assembly to be tested is positioned. One of the two sound sources is located substantially on the longitudinal axis of this elongated chamber, and the acoustical energy output from this source is directed along this axis until it intercepts the component being tested. The other source of energy, however, is positioned so that the energy output thereof is directed along a path which is angularly related to the longitudinal axis of the chamber, this angular relationship being 90° in a preferred embodiment. In order for the output of this last-mentioned energy source to be received by the component being tested, means are interposed in the path of this energy for diverting it so that, following such divergence, it is intermixed with the energy output of the first-mentioned source, following which mixing operation all of the energy travels along an essentially common path to the testing area. The means for so mixing the output of the respective energy sources, in a preferred embodiment, is in the form of an acoustical mirror which is designed to perform a dual function. Although it lies in the path of the energy output of one of the two sources, nevertheless it is arranged to pass therethrough energy from that source. Still further, it is intended to intercept the energy ouput of the remaining source, and to reflect such intercepted energy along a new path angularly related to that over which the arriving energy traveled and parallelly related to the path of the energy passing therethorugh from the first-mentioned source. Thus, this acoustical mirror functions as a "mixing" device to combine energy, arriving thereat from spaced-apart sources, into an output in which the energy thus mixed is in a sense integrated into a single beam of acoustical wave energy.

One object of the present invention, therefore, is to provide an acoustical testing chamber in which various environmental conditions may be readily simulated.

Another object of the invention is to provide an acoustical chamber which permits sound vibrations developed by a pair of remotely-positioned sources to be readily mixed and directed to a test object along a single path.

A further object of the invention is to provide an acoustical test chamber incorporating a sound mixing element positioned to pass therethrough sound vibrations within a predetermined frequency range and to reflect therefrom other sound vibrations lying within a different frequency range, both the sound waves which have passed through the mixing device and those which have been reflected therefrom reaching the object under test along a common path.

Other objects and many of the attendant advantages of this invention will be readily appreciated as the same become better understood by reference to the following detailed description when considered in connection with the accompanying drawings wherein.

Figure 1:
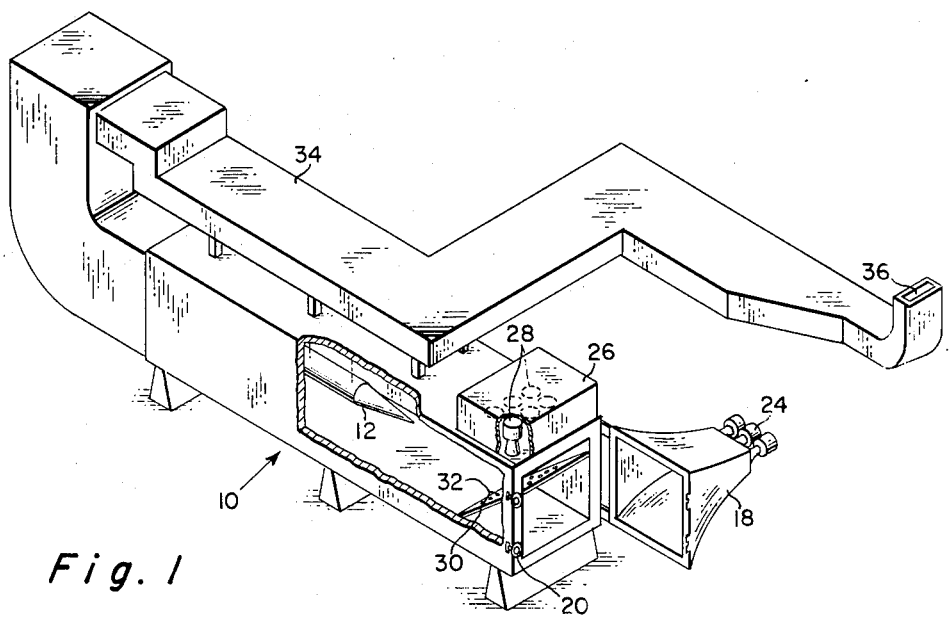
FIG. 1 is an isometric view partially broken away of an acoustical chamber designed in accordance with a preferred embodiment of the present invention.
Figure 2:
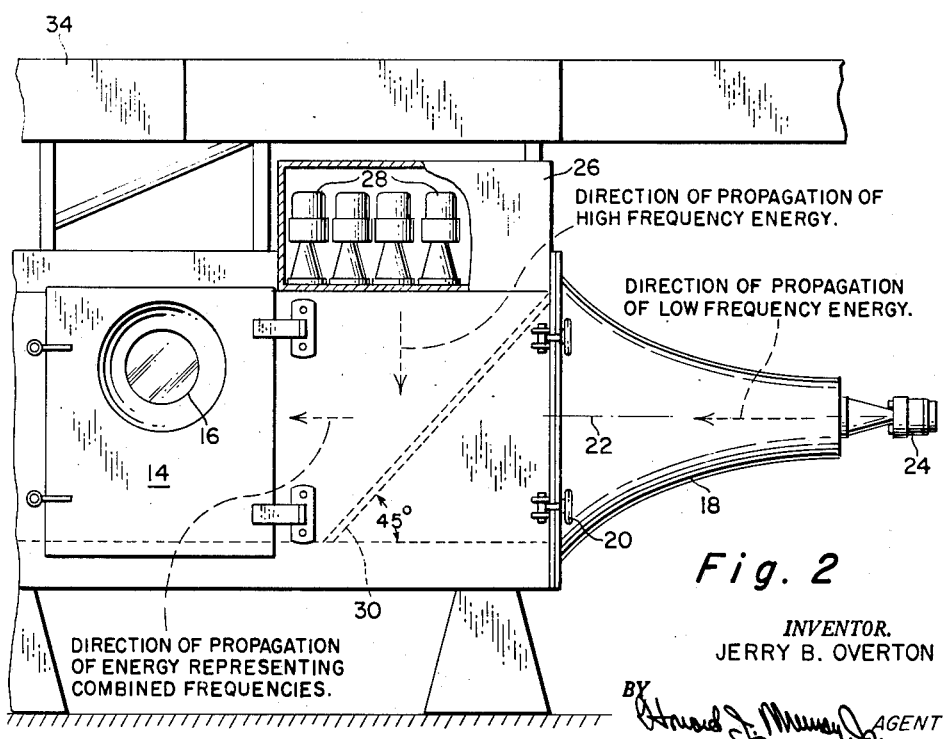
FIG. 2 is an enlarged side elevation of a portion of the acoustical chamber of FIG. 1, with the low-frequency generating section in operating position, and further showing by broken lines the location of the acoustical mirror.

Referring now to FIGS. 1 and 2 of the drawings, there is shown a particularly suitable design for an acoustical chamber based upon the principles herein disclosed. This acoustical chamber is composed of four functionally-distinct sections which combine, as shown, into a single unitary structure. The latter includes a testing region, generally identified by the reference numeral 10, in which some assembly or component (such as the missile illustrated in the drawing and identified by the reference numeral 12) is suitably positioned. The testing region or area 10 is preferably in the form of an elongated generally rectangular tunnel, the walls of which are of massive construction in order to minimize energy absorption and increase the operating efficiency of the unit. For example, it has been found in practice that the walls of this chamber 10 may advantageously be constructed of concrete having a thickness of approximately 6 inches and lined with ½ inch steel plate. A chamber so constructed is found to maintain a high-energy level throughout its length, in fact, measurements have shown that the sound pressure level under ordinary conditions of operation does not deviate more than approximately 3 decibels at any point within the chamber. Purely as an example, the dimensions of a chamber of adequate size for the testing of small missiles is 3½ feet on a side and a length of 18 feet.

To permit access to the interior of the testing section 10, a door (14 in FIG. 2) is provided which is hinged in the manner illustrated. It incorporates a window 16 through which the interior of the test section is made visible to personnel operating the chamber. Access to the interior is also possible by opening a hinged reverse-exponential horn 18 which forms one end of the test section 10. This horn 18 is shown open in FIG. 1 and closed in FIG. 2 and when closed is secured in position by means of conventional locking devices 20.

It will be seen, especially in FIG. 2, that the horn 18 is symmetrically configured and has an axis 22 which coincides with the longitudinal axis of the elongated test section 10. Purely as an example, the horn 18 may also be constructed with walls of 6 inch concrete, lined with ½ inch steel plate.

At a constricted end of the horn 18 is mounted a source of relatively low-frequency acoustical energy. This energy source may comprise three air modulators 24, the arrangement of which is best shown in FIG. 1, wherein they are aligned in a horizontal plane and centered with respect to the axis 22 of horn 18. These air modulators 24 may, in a preferred embodiment, comprise electro-pneumatic speakers each of which is adapted to modulate 200 cfm of air at 40 p.s.i.g. It has been found that, for a majority of testing purposes, each of these modulators 24 should respond to electrical signals having frequencies up to 2000 cps. When in operation, the three air modulators 24 provide a total of 4500 acoustical watts in the low-frequency range. All of this energy output of the modulators 24 is directed alongs paths parallelly related to the axis 22 of the assembly to reach the area in which a test component, such as the missile 12, is located.

It is desired that the over-all frequency range of the sound vibrations developed by the acoustical chamber of FIGS. 1 and 2 be sufficiently high to yield performance data useful in designing components which will operate under all environmental conditions which are anticipated during actual missile flight. The maximum frequency of the acoustical vibrations produced by the sources 24, however, does not extend into a region from which additional useful performance data could be derived. Consequently, to expand the field of utility of the acoustical chamber of the present concept, a further source of sound energy is provided, this latter source having a frequency range which may extend as high as 10 kilocycles, with a lower limit of approximately 300 cycles. This source, which will hereinafter be termed the high-frequency source, is generally indicated in the drawing by the reference numeral 26. Although any suitable device may be employed for generating acoustical energy over this particular frequency band, nevertheless it has been found that a relatively large number of speakers may be arranged in close proximity to one another, each of these speakers being designated in FIG. 2 of the drawings by the reference numeral 28. As also best shown in FIG. 2, these speakers 28 are positioned so that the acoustical output thereof is directed vertically downward toward the base of the test chamber. Any number of speakers 28 may be employed according to the sound amplitude desired, although in practice 32 speakers, arranged in closely-grouped fashion with each speaker having an output of 7 to 10 acoustical watts, has been found to be especially satisfactory. Furthermore, it has been determined that these high-frequency speakers 28 should be of the electromagnetic type for maximum efficiency of operation. Although the frequency range of the speakers 24 is broadly from 60 to 1200 cps., and although the corresponding range of the speakers 28 is roughly from 300 to 10,000 cycles, it may be stated in general that, with respect to the sound energy reaching the test object 12, that portion thereof which lies below approximately 1,000 cycles is provided primarily by the speakers 24, and that portion thereof which lies above approximately 1,000 cycles is provided by the speakers 28.

A principal feature of the present disclosure is the provision of means for enabling a major portion of the sound energy generated by both the sources 24 and 28 to be combined and then directed along a common path so that this combined energy reaches the test object 12 and simulates the conditions which the test object 12 would encounter during actual operation. To achieve this objective, a particular form of "mixing" element is interposed in the path of the low-frequency energy generated by the speakers 24, this mixing element also lying in the path of the high-frequency sound generated by the speakers 28. Such mixing element is illustrated in FIG. 1, where it is identified by the reference numeral 30, and also shown in FIG. 2, where it is set forth in broken lines. The function of this mixing element 30 is to combine both the high- and low-frequency sound vibrations respectively generated by the speakers 28 and 24, so that after being thus combined the resulting acoustical energy will extend over a frequency band adequate to yield the test results desired.

To achieve this objective, the mixing element 30 is formed to function as a reflector of energy impinging one surface thereof from a given direction, while at the same time permitting energy arriving on its other surface from a different direction to pass therethrough with relatively little attenuation.

Figure 3:
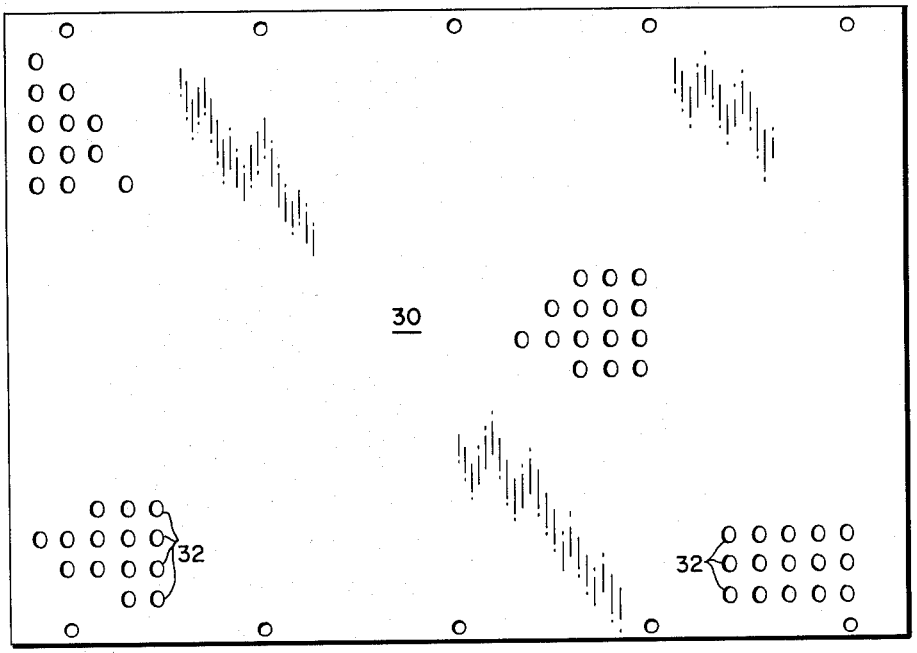
FIG. 3 is a plan view of a preferred form of acoustical mirror particularly suitable for use in the chamber of FIGS. 1 and 2.
Figure 4:
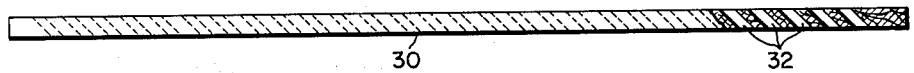
FIG. 4 is an elevational view, partly in section, of the acoustical mirror of FIG. 3.

A mixing element of this nature is set forth in detail in FIGS. 3 and 4 of the drawings, and for convenience of description will hereinafter be referred to as an acoustical mirror. This acoustical mirror is configured as a rectangular plate formed of some rigid substance such, for example, as metal or plywood, at least one surface of which is smooth. Its external dimensions are such that it fits snugly within the testing chamber of FIGS. 1 and 2 when it is positioned at an angle of 45° with respect to the lower or base surface of the chamber.

The acoustical mirror 30, by being thus positioned at an angle of 45° to the horizontal lower surface of the test chamber, also lies at an angle of 45° to the initial path of the high-frequency energy which is directed vertically downward from the speakers 28. Consequently, this high-frequency energy, after impinging the smooth surface of "mirror" 30, will be redirected horizontally toward the test object 12 along a path which essentially coincides with the axis 22 of both the test chamber 10 and of the exponential horn 18. As a result, the sound waves developed by the unit 26 reach the test object 12 with very little reduction in strength.

In order to enable the low-frequency energy generated by the speakers 24 to reach the test object 12, it is necessary that means be provided to allow this low-frequency energy to pass through the "mirror" 30 minimum attenuation. This is accomplished, in accordance with the present concept, by providing a plurality of openings or apertures 32 in the mirror. A relatively small number of these openings 32 are illustrated in FIGS. 3 and 4, although it will be understood that the entire surface of the mirror 30 is thus apertured in a preferably uniform fashion. When sound waves from the speakers 24 reach the plate 30, they pass through the apertures 32 and continue on until they reach the test object 12.

It has been found that the efficiency of passage of these low-frequency sound waves from the speakers 24 through the apertures 32 may be raised to a very considerable degree by aligning the apertures 32 in a particular fashion with respect to the surface of the acoustical mirror 30. This is clearly brought out from the showing of FIG. 4, in which the axis of each aperture 32 is shown as lying at an angle of 45° to each plane surface of the mirror. Consequently, when the mirror 30 is in its operating position within the test chamber as shown in FIGS. 1 and 2, the apertures 32 are so aligned that the axis of each aperture 32 is horizontal, or, in other words, parallel to the axis 22 of the test unit. This facilitates the passage of the low-frequency sound waves through mirror 30, and results in a marked reduction in energy losses as compared to a reflector in which the apertures are not so aligned.

It has been found in practice that an acoustical mirror such as described above may be constructed of plywood of 1 inch thickness having apertures of ⅜ inch diameter formed therein, these apertures being symmetrically spaced on 1 inch centers. However, when the mirror is composed of metallic material such as aluminum, its thickness is governed by the degree of rigidity required to prevent undesirable resonance effects.

Where the acoustical chamber of FIGS. 1 and 2 is to be utilized in locations where the output thereof would reach objectionable noise levels, it is practicable to muffle the noise before expelling the airflow into the atmosphere. A suitable muffler unit, generally desigated as 34 in the drawing, may comprise a number of sections preferably formed of sheet metal lined with relatively thick fiberglass. The action of the muffler section 34 is enhanced by forming a number of sharp bends therein, these being particularly effective in reducing the high-frequency portion of the energy passing therethrough before reaching the outlet 36. With a reasonably long length for the muffler 34, it has been found that the overall sound level may be reduced as much as 70 decibels.

Obviously many modifications and variations of the present invention are possible in the light of the above teachings. It is, therefore, to be understood that within the scope of the appended claims the invention may be practiced otherwise than as specifically described.

I claim:

1. A chamber for the testing of a device under conditions which are controllable to simulate the acoustic environment in which such device is designed to function, said chamber including a region wherein the device to be tested is positioned, a first source of acoustic energy located within said chamber having a generally predetermined frequency range, a second source of acoustic energy also located within said chamber and having a generally predetermined frequency range different from that of said first source, said first source being positioned to direct energy emanating therefrom to the vicinity of said test device along an essentially linear path, said second source being positioned to direct energy emanating therefrom to the vicinity of said test device along a path the initial portion of which is angularly related to the path of the energy emanating from said first source, and means for diverting a portion of the energy emanating from said second source after it has traversed the initial portion of its path so that the remaining portion of such path lying between said diverting means and said test device substantially coincides with the linear path followed by the energy output of said first source.

2. The combination of claim 1, in which the said last mentioned means acts to reflect energy emanating from said second source, such reflecting means being positioned in the path of the energy emanating from said first source and acting to pass therethrough at least a portion of this last-mentioned energy.

3. The combination of claim 2, in which said reflecting means comprises a sheet of relatively rigid material having a planar surface from which energy emanating from said second source is reflected, the planar surface of said sheet forming an angle of essentially 45° to the path of the acoustic energy emanating from said first source, said sheet being permeable to at least a portion of the acoustic energy emanating from said first source.

4. The combination of claim 3, in which said sheet is provided with a plurality of apertures through which energy emanating from said first source is intended to pass.

5. The combination of claim 4, in which the apertures in said sheet are of essentially cylindrical outline, the respective axes of these cylindrical apertures being parallel both with respect to one another and also with respect to the path followed by the acoustic energy emanating from said first source.

6. An assembly for testing a device under conditions which simulate the acoustic environment in which such device is intended to function, said assembly including a chamber in which the device to be tested is located, means for generating acoustic energy having a first predetermined frequency range and for directing such acoustic energy along an essentially linear path to the chamber in which said test device is located, further means for generating acoustic energy having a second predetermined frequency range the upper limit of which is higher than the upper limit of said first frequency range and for directing such acoustic energy along a path which is essentially normal to the path of the acoustic energy generated by said first-mentioned means, and means located in the path of the acoustic energy generated by said first-mentioned means for receiving the acoustic energy generated by said further means and redirecting a portion of such energy along a new path which substantially coincides with the linear path followed by the energy generated by said first-mentioned means, said last-mentioned means being permeable to at least a portion of the acoustic energy generated by said first-mentioned means.

7. An assembly according to claim 6, in which the means for receiving the acoustic energy generated by said further means comprises means acting to reflect a portion of the acoustic energy generated by said further means while at the same time acting to pass therethrough a portion of the acoustic energy generated by said first-mentioned means.

8. An assembly according to claim 7, in which the means which acts to reflect a portion of the acoustic energy generated by said further means while at the same time acting to pass therethrough a portion of the acoustic energy generated by said first-mentioned means comprises a sheet of relatively rigid material having at least one substantially planar surface on which the acoustic energy generated by said further means is adapted to impinge, said sheet being so positioned with respect to the said first energy-generating means that the planar surface thereof forms an angle of approximately 45° to the path of the acoustic energy generated by such first-mentioned means, said sheet being formed with a plurality of elongated apertures the respective longitudinal axes of which are aligned both with one another and with the path followed by the acoustic energy generated by said first-mentioned means.

9. The combination of claim 8, in which the relatively rigid material of said sheet is multilayer plywood.

10. The combination of claim 8, in which the relatively rigid material of said sheet is aluminum.

11. An acoustic energy mixing device for incorporation into an assembly designed for the testing of an object under conditions which simulate the acoustic environment in which such object is intended to function, said assembly including a chamber in which the object to be tested is located, means for generating acoustic energy having a first-predetermined frequency range and for directing such acoustic energy along an essentially linear path to the chamber in which said test object is located, further means for generating acoustic energy having a second predetermined frequency range different from the frequency range of the energy generated by said first-mentioned means and for directing such acoustic energy along a path the initial portion of which is essentially normal to the path of the acoustic energy generated by said first-mentioned means, said mixing device comprising a sheet of material having at least one substantially planar surface and located in the path of the acoustic energy generated by said first-mentioned means, the planar surface of said sheet being disposed at an angle of approximately 45° to the path of the acoustic energy generated by said first-mentioned means and being adapted to receive thereon the acoustic energy generated by said further means, whereby at least a portion of such last-mentioned energy will be reflected toward said test object along a path which substantially coincides with that followed by energy generated by said first-mentioned means, said sheet being provided with a plurality of elongated apertures formed therein the respective longitudinal axes of which are aligned both with respect to one another and with respect to the path followed by the acoustic energy generated by said first-mentioned means.

References Cited by the Examiner

UNITED STATES PATENTS

| | | | |
|---|---|---|---|
| 2,050,575 | 8/36 | Krause | 181—31 |
| 2,610,694 | 9/52 | Boer | 181—31 |
| 2,782,632 | 2/57 | Klein | 181—.5 X |
| 2,808,121 | 10/57 | Goettner | 181—31 |
| 2,859,610 | 11/58 | Dickey | 73—69 |
| 3,104,543 | 9/63 | Kaminski | 73—69 |

RICHARD C. QUEISSER, *Primary Examiner.*

ALDRICH F. MEDBERY, JOHN P. BEAUCHAMP,
*Examiners.*